United States Patent [19]

Cudney et al.

[11] Patent Number: 5,005,927
[45] Date of Patent: Apr. 9, 1991

[54] NONLINEAR OPTICAL MICROSCOPE

[75] Inventors: Roger S. Cudney, Los Angeles; Robert M. Pierce, San Pedro; Jack L. Feinberg, Manhattan Beach, all of Calif.

[73] Assignee: The United States of America as represented by the Secretary of the Air Force, Washington, D.C.

[21] Appl. No.: 329,731

[22] Filed: Mar. 28, 1989

[51] Int. Cl.$^5$ .................. G03H 1/02; G02B 21/00
[52] U.S. Cl. .................. 350/3.64; 350/509
[58] Field of Search .................. 350/3.64, 509, 510

[56] References Cited

U.S. PATENT DOCUMENTS

| | | | |
|---|---|---|---|
| 3,511,552 | 5/1970 | Osterberg | 350/509 |
| 3,511,554 | 5/1970 | Osterberg et al. | 350/509 |
| 3,701,579 | 10/1972 | Zollner | 350/509 |
| 4,062,619 | 12/1977 | Hoffman | 350/509 |
| 4,249,540 | 2/1981 | Koyama et al. | 128/666 |
| 4,272,192 | 6/1981 | Matsuda | 350/3.73 |
| 4,598,311 | 7/1986 | Bellina | 358/93 |
| 4,629,687 | 12/1986 | Schindler et al. | 435/4 |
| 4,721,362 | 1/1988 | Brody et al. | 350/3.64 |
| 4,727,314 | 2/1988 | Lapeyrolerie et al. | 324/102 |
| 4,728,165 | 3/1988 | Powell et al. | 350/3.64 |
| 4,733,063 | 2/1988 | Kimura et al. | 250/201 |
| 4,773,719 | 9/1988 | Anderson et al. | 350/3.64 |
| 4,796,974 | 1/1989 | Brakenhoff | 350/247 |
| 4,800,269 | 1/1989 | Horikawa | 250/234 |

OTHER PUBLICATIONS

Cronin-Golomb et al.; "Photorefractive Time Differentiation of Coherent Optical Images"; *Optics Letters*; vol. 12, No. 12; Dec. 1987; pp. 1029-1031.

Mischgofsky; "Compound Holographic Interference and Conventional Microscope and its Application on Crystal Growth from Solution"; *SPIE*, vol. 236; 1980; pp. 86-94.

Lekhtsier; "Holographic Microscopy in Measurement Techniques"; *Izmeritel'naya Tekhnika*, No. 9; Sep. 1978; pp. 1199-1204.

Thompson; "New Approaches to Phase Microscopy"; *SPIE*, vol. 104, Apr. 1977; pp. 6-15.

Feinberg et al., "Photorefractive Effects and Charge Migration in Barium Titanate" published in the Journal of Applied Physics, vol. 51, #3, p. 1297, Mar. 1980.

Cudney et al., "The Transient Detection Microscope" published on Mar. 31, 1988 in vol. 332 of Nature (International Weekly Journal of Science).

*Primary Examiner*—Bruce Y. Arnold
*Assistant Examiner*—David R. Parsons
*Attorney, Agent, or Firm*—William G. Auton; Donald J. Singer

[57] ABSTRACT

A microscope that preferentially displays either moving or stationary objects. This all-optical device operates in real-time using the coupling of optical beams in suitable nonlinear medium such as a photorefractive crystal of barium titanate. A holographic image is continuously written and compared with the real image. For the transient detection microscope any discrepancy between the two images is immediately visible. In the stationary object enhancing microscope stationary objects are enhanced and preferentially displayed.

2 Claims, 1 Drawing Sheet

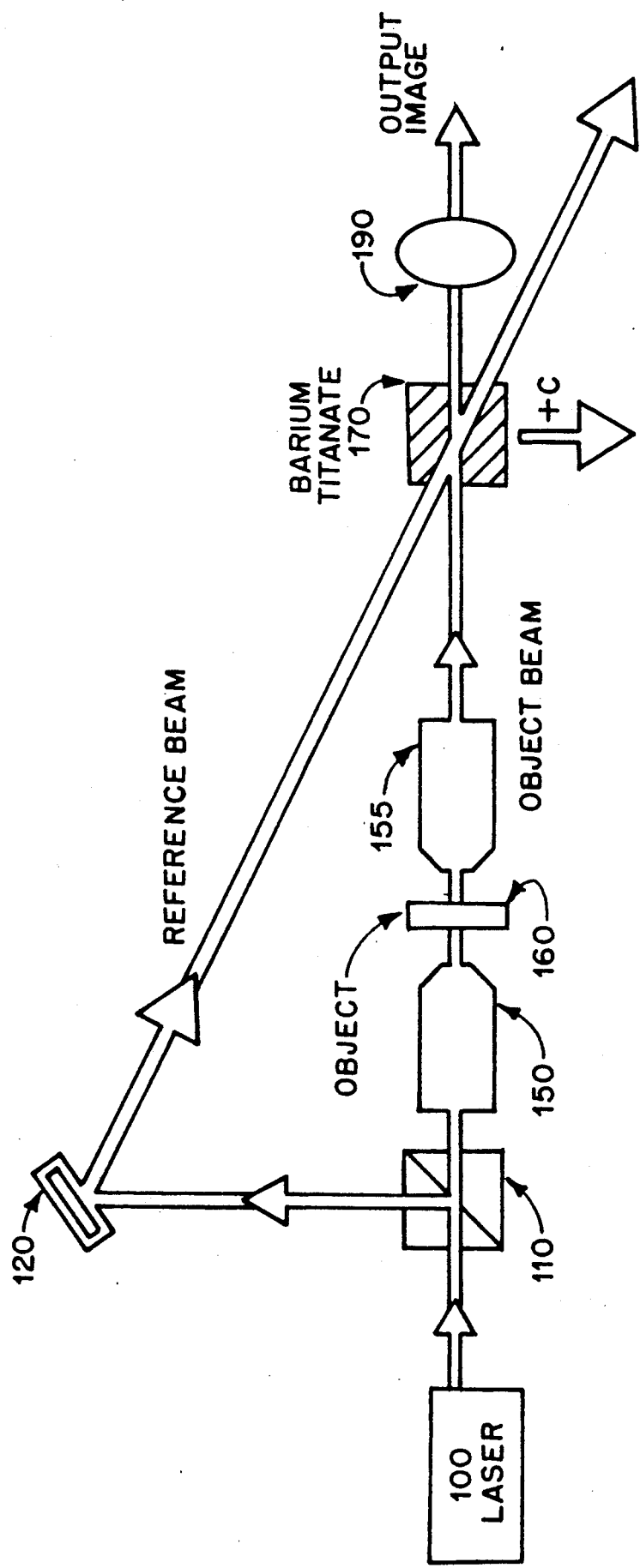

NONLINEAR OPTICAL MICROSCOPE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to transient detectors, and more specifically the invention pertains to a microscope that preferentially displays stationary or moving objects. One example of this all-optical device operates in real-time using the nonlinear coupling of optical beams in a photorefractive crystal of barium titanate. A holographic image is continuously stored and compared with the real image, and any discrepancy between the two images is immediately visible. The device can be used to highlight either stationary or moving objects. The device needs only milliwatts of laser power, and can detect objects moving at velocities which can be set by the device to range from a few micrometers per second to hundreds of times faster.

Tracking the motion of a swimming protozoan against a motley background of stationary algae, fragments of extraneous material and other obfuscating elements would be simpler if it were possible to get rid of the background. Unfortunately, modern transient detectors deal mainly with macroscopic events, while conventional laser microscopes do not discriminate between moving and stationary microscopic objects. Electronic transient detectors have been used by airport controllers to detect moving airplanes and to eliminate buildings and trees from their television displays. These electronic processors subtract a stored image from the current image serially, pixel by pixel. An excellent example of a transient detector system is disclosed in Lapeyerolerie U.S. Pat. No. 4,727,314, the disclosure of which is incorporated herein by reference. While the system of Lapeyerolerie et al is exemplary in the art, it illustrates that existing technology for motion detection uses a digital computer to process the image. The image must first be partitioned into many separate pixels, and a large memory is required to store each picture. Separate pictures are acquired, stored, and digitally subtracted, pixel by pixel. The process is relatively slow, so that real-time operation is only possible with a high speed digital electronic computer dedicated to this task. Additionally, partitioning the image into pixels degrades the resolution of the picture.

Another limitation of existing transient detectors is that they are confined in their use to macroscopic events. The task of providing transient detection microscope that is a purely optical device is alleviated, to some extent, by the systems disclosed in the following U.S. patents, the disclosures of which are specifically incorporated herein by reference:
Anderson U.S. Pat. No. 4,773,719;
Horikawa U.S. Pat. No. 4,800,269;
Harvey U.S. Pat. No. 4,796,974;
Kimura U.S. Pat. No. 4,733,063;
Schindler U.S. Pat. No. 4,629,687;
Bellina U.S. Pat. No. 4,598,311; and
Koyama U.S. Pat. No. 4,249,540.

All of the references that are immediately cited above (with the exception of the Anderson et al reference) disclose laser microscope systems. The Anderson et al reference discloses some of the technology used in the present invention, and is discussed briefly below.

In the system of Anderson et al, changes in an image are detectable by a tracking novelty filter while an incorporated holographic medium is in disequilibrium. A suitably doped single-domain barium titanate crystal serves as the holographic medium. Image information is imposed on a laser beam in the form of a spatially varying polarization across the beam cross section spatial position. The modulated beam is directed to the crystal, which cooperates with a polarizing beam splitter and a half wave plate to define a polarization conjugator. This conjugator generates a beam which is the time reversed or phase conjugate version of the incoming beam. This conjugated beam passes back through the modulator a second time and then is operated on by a beam splitter. When nothing in the image is changing the crystal is in equilibrium with the incident laser light, and the beam splitter directs minimal light to a detector. However, when an image change causes a change in the applied modulation of the incident laser beam, then, while the holographic medium is in disequilibrium, the changed image elements are intensified at the detector. While the above cited references are instructive, the need remains to provide a transient detection microscope which preferentially displays moving objects. The present invention is intended to satisfy that need.

SUMMARY OF THE INVENTION

The present invention includes a transient detection microscope that preferentially displays moving objects which in one example uses: a laser light source, a beam splitter, two microscope focusing optical elements, a mirror, a microscope slide, a barium titanate photorefractive crystal, and an output lens or eyepiece.

In operation, the laser light source emits an incident illuminating laser beam which illuminates a transparent sample. The beam passing through the sample (which we call the object beam) is directed into a photorefractive crystal. A beam splitter extracts a reference beam from the illuminating laser and forwards it to the photorefractive crystal.

The object beam intersects the reference beam in the barium titanate photorefractive crystal, which optically subtracts them as nonlinear coupling takes place between the two beams as described below.

The microscope normally will be used by shining the illuminating laser beam through some microscopic scene in the sample to create a continuous series of holograms inside the transparent barium titanate photorefractive crystal. Inside the crystal the object beam intersects the reference beam so that the two beams interfere with each other, sometimes adding the crests or troughs of their waves to produce bright bands of light, and sometimes canceling each other to produce dark bands.

Wherever a dark interference band falls on some tiny region inside the barium titanate photo refractive crystal, electrical charges are drawn to the region from elsewhere in the crystal structure. Similarly, exposure of a region of the crystal to a bright interference band repels electrical charges. These electronic changes in the microscopic structure of the crystal cause changes in the refractive index ability of the transparent material, and a hologram results.

This hologram deflects a portion of the reference beam in the same direction as the transmitted portion of the object beam. If the hologram formed in the photorefractive crystal is such that these two beams are 180 degrees out of phase, they destructively interfere or cancel. These two beams will be 180 degrees out of phase if nothing in the object is changing or moving, and if the holographic nonlinear material is a photorefractive crystal operated with no applied or intrinsic electric field. As described above, the induced phase difference allows selective viewing of moving objects, with the stationary background eliminated from the image. Alternately, the object could be moving with a constant velocity, and the crystal applied with a particular field such that the viewing of objects with particular velocities is possible. Additionally, the crystal can be replaced by a suitable nonlinear material such as sodium vapor, which is operated to give the same 180 degree phase shift between the transmitted object beam and the holographically deflected reference beam. Those skilled in the art will be familiar with suitable nonlinear materials which can operate a substitute for the photorefractive crystal.

The system of the present invention may be operated as either a transient detection microscope that preferentially displays moving objects, and as a stationary object enhancing microscope, which enhances and displays stationary objects. The selection of the mode of operation is made by selecting a desired variation in the refractive index of the barium titanate photorefractive crystal. This variation is made by the rotation of the crystal axis "C" to create the phase hologram which results from the interference between the image of the object beam with the image of the reference beam. When the lattice structure of the crystal (which is not symmetrical) is rotated to cause a destructive interference between the two beams (with a phase difference of about 180 degrees) all unchanging (stationary) images are cancelled out, and only moving objects remain in the image. When the crystal axis is rotated to cause a constructive interference between the two beams, the unchanging (stationary) images are enhanced and predominantly displayed since the intensity of their image is doubled.

The result is an effective transient detection microscope that automatically displays moving objects while editing out stationary features.

It is an object of the present invention to provide a means for tracking the motion of moving microscopic objects, such as swimming protozoa.

It is another object of the present invention to provide a transient detection microscope that displays moving objects and eliminates the stationary background.

It is another object of the invention to allow the selective viewing of objects of phenomena with particular velocities which may be selected.

These objects together with other objects, features and advantages of the invention will become more readily apparent from the following detailed description when taken in conjunction with the accompanying drawing wherein like elements are given like reference numerals throughout.

DESCRIPTION OF THE DRAWING

The sole figure of the drawing is a sketch illustrating preferred embodiment of the present invention.

DETAILED DESCRIPTION OF THE PREFERRED EMBODIMENT

The present invention includes a transient detection microscope that displays moving microscopic objects while eliminating the stationary background.

The reader's attention is now directed towards the figure, which is a schematic of the preferred embodiment of the present invention. This system is a transient detection microscope that preferentially displays moving microscopic objects using: a laser light source 100, a beam splitter 110, a mirror 120, two microscope objective lens elements 150 and 155, a transparent sample, which may be a microscope slide 160, a nonlinear medium which may be a barium titanate photorefractive crystal 170, and an eyepiece 190 or other detectors such as camera.

As mentioned above, the laser light source 100 emits an incident illuminating laser beam which illuminates an object of interest as it rests on the microscope slide 160. The beam splitter 110 extracts a reference beam from the illuminating laser beam while forwarding the illuminating beam through the microscope focusing optical elements 150 onto the microscope slide 160.

The illuminating beam illuminates the object of interest on the microscope slide 160, and yields thereby an object beam. The object beam intersects the reference beam in the barium titanate photorefractive crystal 170, which optically subtracts them as nonlinear coupling takes place between the two beams as described below.

The transient detection microscope described here optically subtracts two images in parallel, so that the entire image is processed at the same time. Subtraction is accomplished by the nonlinear coupling of two optical beams in a photorefractive crystal, and is analogous to holographic interferometry.

The transient detection microscope uses no electronics; it is a single-task, all-optical processor, which continuously updates the image to be optically subtracted. The hologram of the image, recorded in the barium titanate crystal, is constantly being written and read in real-time, and the old image is continuously subtracted from the new one. A barium titanate crystal is used because it exhibits strong coupling between even weak (micro-watt) optical beams, and its time response can be made quite slow (seconds) using low-intensity optical beams.

The transient detector relies on the transfer of energy between two optical beams, as follows. Consider an object-bearing beam (or 'object' beam) and a 'reference' beam intersecting in the barium titanate crystal. If the two beams are coherent, they can produce an optical interference pattern that, by the photorefractive effect, creates a phase hologram inside the crystal. The same beams that write the hologram can also read it. Consequently, a fraction of the reference beam will be diffracted by the hologram into the same direction as the transmitted object beam. (Similarly, a fraction of the object beam will be diffracted by the hologram into the direction of the transmitted reference beam.) The diffracted reference beam receives a $+90°$ phase shift upon reflection from the phase hologram, and another $+90°$ phase shift due to the diffusive writing mechanism inside the barium titanate crystal (that is, there is a $90°$ phase shift between the interference patter of the light beams and the resulting refractive-index grating formed inside the crystal). The net phase shift between the diffracted reference beam and the transmitted object beam will be 180°, which causes the two beams to interfere destructively. (Conversely, the diffracted object beam receives a net phase shift of 0°, and so it interferes constructively with the transmitted reference beam.) The net effect is that the object beam exits the crystal greatly diminished in intensity, with its energy having been transferred to the reference beam. The intensity of the transmitted object beam, $I'_o$, is given by $$I'_o = \frac{I_o + I_r}{1 + (I_r/I_o)\exp(\Gamma s)} \quad (1)$$

where $I_o$ and $I_r$ are the intensities of the transmitted object and reference beams in the absence of coupling, s is the interaction length in the crystal, and $\Gamma$ is the photorefractive coupling constant, which depends on the wavelength, polarization, and angle between the two beams, as well as the type and orientation of the photorefractive crystal. From equation (1), the fraction $I'_o/I_o$ of the object beam intensity emerging from the crystal is $$I'_o/I_o \sim \exp(-\Gamma s) \quad (2)$$

for $I_o < I_r$. For the experiments where the above was tested, the coupling strength is $\Gamma s = 3.4$, so that the object beam loses about 97% of its energy to the reference beam. The photorefractive hologram requires a finite time $\tau$ to be written or erased. If either optical beam changes in a time short compared with $\tau$, the destructive interference described above is no longer optimized, and the image will become immediately visible. Note that this enhancement of moving objects occurs instantly, and is not limited by the response time $\tau$. In particular, if just a portion of the object beam changes rapidly compared with $\tau$, that portion will emerge from the crystal with its intensity enhanced, while the rest of the image will be depleted, as before. Thus any moving or changing images in the object beam will be highlighted against a dark, stationary background.

The device resembles an ordinary transmission microscope with a microscope objective lens and an eyepiece or camera for viewing the real image. However, here the illumination is by laser light, and a barium titanate crystal is located between the objective and eyepiece. As shown in the figure, the object beam from an argon-ion laser is focused by a ×10 microscope objective 152 to a 100 μm diameter spot which illuminates the object. A second ×10 microscope objective 155 collects the light, and forms a real image of the object in a barium titanate crystal. A second laser beam (the reference beam), coherent with and considerably more intense than the object beam, is also directed into the crystal. The ferroelectric axis of the barium titanate crystal 120 is oriented so that energy is transferred from the object beam into the reference beam. The portion of the object beam transmitted through the crystal is viewed either with an eyepiece 140 or with a television camera, or other detector.

The microscope laser source 100, both of the two microscope objective elements 150 and 155, and eyepiece 190 resemble those currently used in laser microscope as described in the above-cited U.S. patents. Without the reference beam the apparatus is an ordinary microscope, and the entire image is visible. With the reference beam, transient detection is activated, and the image appears almost black, because nothing in the object beam is changing in phase, amplitude or position. However, if the microscopic object suddenly moves, a bright image instantly appears. As the object has moved from its old position, the device detects the change in the old image and displays it. The object is also in a new position where it was not before, so the transient detector displays this new image as well. The transient detector 'tracks' the changing input, updating and rewriting new sets of holograms, as fast as the crystal response time allows.

In operation, the transient detector in one application is used to preferentially display the motion of small, self-animated objects found in a local pond. When the transient detector has been turned on, the images of any non-moving objects in the scene, including the algae and any stationary protozoans, are largely removed from the scene by the transient detector.

Note that if the input pattern changes too slowly, the transient detector will track the changes, and no output will be produced. Any object must move at least one resolvable spot in a time shorter than the characteristic writing time for the transient detector to 'see' it. For linear motion, the minimum detectable velocity is determined by the crystal's response time according to $$v = d/\tau \quad (3)$$

where d is the minimum resolvable feature size of the microscope, and $\tau$ is the hologram writing time, which is a function of the total optical intensity, $I_r + I_o$, in the crystal. Note that a wide range of minimum speeds may be selected by varying the intensity of the reference beam, while leaving the object beam intensity fixed at some level small enough to avoid damaging the sample.

In the one example, the images were produced using 10mW in the reference beam focused to a 2-mm diameter spot inside the crystal ($I = 0.3$ W cm$^{-2}$) and only 80 μW of object beam power focused to a 0.5-mm diameter spot ($I_o = 0.04$ W cm$^{-2}$). The response time $\tau$ this illumination was 0.2 s and the resolution d was 5 μm, which from equation (3) gives a minimum detectable speed of 25 μm s$^{-1}$.

We also point out that it is possible to build an image intensifier from the same geometry as that used for the transient detection microscope, simply by aligning the crystal's c-axis in the opposite direction to that shown in the figure. Such a device would be the opposite of a transient detector, and would intensify, by the same gain factor exp ($\Gamma$ s), only the images of stationary objects.

Further details of the properties of the barium titanate crystal as a holographic medium are described in the above-cited Anderson et al patent. The details of the properties of a barium titanate crystal as a holographic medium are also described in a technical article by Feinberg et al entitled "Photorefractive Effects and Charge Migration in Barium Titanate" which is published in the Journal of Applied Physics, vol. 51, #3 page 1297 in March 1980, the disclosure of which is incorporated herein by reference.

As described above, the invention will detect and display moving objects while suppressing a stationary background. When the barium titanate crystal is used as the holographic medium as depicted in the figure, the 180 degree phase shift between the reference beam and the object beam cancels out the image of everything in the test sample except moving objects. In practice, the user can rotate the crystal axis (denoted as C) so that the C points up. With this adjustment, the phase difference between the two beams will shift from 180 degrees to zero, so that the beams constructively interfere. This allows preferential viewing of non-moving objects while the image of moving objects is suppressed.

The system of the figure may be operated as either a transient detection microscope that preferentially displays moving objects, and as a stationary object enhancing microscope, which enhances and displays stationary objects. The selection of the mode of operation is made by selecting a desired variation in the refractive index of the barium titanate photorefractive crystal. This variation is made by the rotation of the crystal axis "C" to create the phase hologram which results from the interference between the image of the reference beam. When the lattice structure of the crystal (which is not symmetrical) is rotated to cause a destructive interference between the two beams (with a phase difference of about 180 degrees) all unchanging, (stationary) images are cancelled out, and only moving objects remain in the image. When the crystal axis is rotated to cause a constructive interference between the two beams, the unchanging (stationary) images are enhanced and predominantly displayed since the intensity of their image is doubled.

The advantages of the present invention are as follows.

The device described above can detect and display moving objects in real time. The device does not partition the image into pixels, so it does not degrade the image resolution. The device is simple and it works over a wide range of wavelengths. This all-optical device operates in real-time using the nonlinear coupling of optical beams in a photorefractive crystal or other nonlinear material. A holographic image is continuously stored and also compared with the real image, and any discrepancy between the two images is immediately visible. The device can be used to highlight moving objects, or highlight stationary objects, or objects with selected velocities while suppressing the image of any stationary object in the background.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A stationary object enhancing microscope which displays stationary microscopic objects in a sample while eliminating a moving background from said sample, said stationary object enhancing microscope comprising:
    a means for illuminating said sample which emits an illuminating beam;
    a means for extracting a reference beam from said illuminating beam, said extracting means receiving and propagating said illuminating beam from said illuminating means while extracting said reference beam therefrom;
    a microscope slide which holds said sample in front of said illuminating beam which it receives from said extracting means to yield thereby an object beam, said object beam containing an image of said moving background and an image of said stationary objects; and
    a barium titanate photorefractive crystal which receives and interferes said reference beam from said extracting means with said object beam from said microscope slide to create a phase hologram inside itself, said phase hologram thereby creating constructive interference between said image of said moving background in said object beam with respect to said reference beam from said extracting beam, said barium titanate photorefractive crystal thereby yielding an output that displays predominantly only said stationary microscopic objects.

2. A stationary object enhancing microscope, as defined in claim 1 which includes first and second microscope objective lens elements, said first microscope objective lens element receiving and focusing said illuminating beam from said extracting means onto said sample on said microscope slide; and
    said second microscope objective lens element receiving and focusing said object beam from said microscope slide onto said barium titanate photorefractive crystal.

* * * * *